(12) United States Patent
Prasad et al.

(10) Patent No.: US 7,570,643 B2
(45) Date of Patent: *Aug. 4, 2009

(54) EFFICIENT FRAMING PROCEDURE FOR VARIABLE LENGTH PACKETS

(75) Inventors: Sharat Prasad, San Jose, CA (US); Marinica Rusu, Sunnyvale, CA (US); Hiroshi Suzuki, Palo Alto, CA (US); Shankar Venkataraman, Campbell, CA (US); Stefano Binetti, Monza (IT); Luca Della Chiesa, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 1172 days.

This patent is subject to a terminal disclaimer.

(21) Appl. No.: 10/365,061

(22) Filed: Feb. 12, 2003

(65) Prior Publication Data

US 2004/0156390 A1 Aug. 12, 2004

(51) Int. Cl.
*H04L 12/28* (2006.01)
*H04J 3/24* (2006.01)
(52) U.S. Cl. .................... 370/392; 370/474
(58) Field of Classification Search .......... None
See application file for complete search history.

(56) References Cited

U.S. PATENT DOCUMENTS 6,973,084 B1 * 12/2005 Jha .................. 370/392
7,043,541 B1 * 5/2006 Bechtolsheim et al. ...... 709/223
2002/0090007 A1 * 7/2002 Kamiya et al. .............. 370/476
2003/0058888 A1 * 3/2003 Shinoda ..................... 370/470

FOREIGN PATENT DOCUMENTS

WO WO 01/37498 A1 5/2001

OTHER PUBLICATIONS

Armstrong, Tim, et al., "GFP for Ethernet", Contribution to T1 Standards Project, Jul. 10, 2000, pp. 1-6.
Li, Xin, et al., "Encapsulation and Rate Adaptation for Ethernet Over SDH", State Key Laboratory on Microwave and Digital Communication, Dept. of Electronic Engineering Tsinghua Univ. Beijing, China, vol. 2, Jun. 29, 2002, pp. 1301-1305.
Scholten, Mike, et al., "Data Transport Applications Using GFP", IEEE Communications Magazine, May 2002, pp. 98-103.
Tsiang, Suwala, "The Cisco SRP MAC Layer Protocol", May 1, 2000.
Agilent Technologies, "An Overview of ITU-TG.709", Sep. 2001, pp. 1-12.

* cited by examiner

*Primary Examiner*—Ricky Ngo
*Assistant Examiner*—Clemence Han
(74) *Attorney, Agent, or Firm*—Cindy Kaplan

(57) ABSTRACT

A method of processing Ethernet signals for transport in an optical network system is disclosed. The method includes encapsulating Ethernet frames into EFP frames comprising a length header, a converged data link header, and a data area, and mapping the EFP frames into byte synchronous paths. The converged data link header replaces an Ethernet preamble of the Ethernet packet.

38 Claims, 6 Drawing Sheets

EFFICIENT FRAMING PROCEDURE FOR VARIABLE LENGTH PACKETS

BACKGROUND OF THE INVENTION

The present invention relates generally to digital communication networks, and more specifically, to an efficient framing procedure for variable length packets.

Efficient transfer of traffic requires a network designed in conformance with conventional voice network and suitable for transferring variable length packets. Conventionally, there is SONET/SDH as a digital network for WAN (Wide Area Network). SONET and SDH are a set of related standards for synchronous data transmission over fiber optic networks. SONET is short for Synchronous Optical Network and SDH is an acronym for Synchronous Digital Hierarchy. SONET is the United States version of the standard published by the American National Standards Institute (ANSI). SDH is the international version of the standard published by the International Telecommunications Union (ITU).

Increase in bandwidth demand has been satisfied through a combination of increased line rates (Time Division Multiplexing (TDM)) and transmitting multiple wavelengths through a single fiber (Dense Wave Division Multiplexing (DWDM)). ITU recommendation G.709 ("Interface for the Optical Transport Network (OTN)") builds on the experience and benefits gained from SDH and SONET to provide a route to the next-generation optical network. The ITU-T G.709 frame includes three parts: overhead area for operation, administration, and maintenance functions; payload area for customer data; and forward error correction (FEC). FEC provides additional coded data to enable error checking and correction by a receiving device. There are also conventional FEC implementations based on ITU-T G.975 which support only the transmission of SONET/SDH signal and can not carry OPU.

ITU-T G.709 links running at an appropriate rate can carry 2.5 Gb/s Ethernet (2.5 Gb/s Ethernet is not included in the IEEE 802.3 standard but may be used in proprietary systems, for example), 10 Gb/s Ethernet, and future rate Ethernet. However, there are difficulties with the transparent transport of 10 GE (Gigabit Ethernet) interface, which may or may not transport CDL information (described below), over a WDM system that uses FEC to improve optical system performance. Currently there are two different approaches to solve this problem. One is based on the over clocking of the G.709 frame rate that runs at 10.709 Gb/s at a rate up to 11.09 Gb/s in order to transport the 10.3 Gb/s client signal. The second is the use of ITU-T G.7041 mapping over ITU-T G.709. Both of them have drawbacks. For example, ITU-T G.709 overclocking requires a higher bit rate, which may result in system and hardware problems. ITU-T G.7041 GFP mapping does not provide preamble transparency which creates compatibility issues for technologies such as converged data link (CDL) Ethernet (described in U.S. patent application Ser. No. 09/668,253, filed Sep. 21, 2000, which is incorporated by reference herein in its entirety). IEEE is in the process of standardizing uses of the Ethernet preamble for technologies such as CDL Ethernet. Transport of CDL Ethernet over WDM or ultra-long reach links results in additional requirements. For example, starting at 10 Gb/s for ultra-long reach transmission and for future higher bit rates for even longer reach transmission, FEC is required. Furthermore, as optical switching without OEO conversion is deployed, some OAM information pertaining to all the wavelengths needs to be carried on a separate supervisory wavelength.

Unlike SONET, Ethernet networks rely on non-synchronous signaling techniques. Gigabit Ethernet uses the same frame format specified by the original Ethernet Standard, including variable frame length specified in the Ethernet Standard. Framing procedures have been developed to accommodate variable-length packets with various protocols in an OTN using WDM in addition to SONET/SDH. However, existing framing procedures (e.g., HDLC, Generic Framing Procedure Transparent Mode, Generic Framing Procedure Fame Mode) suffer from disadvantages such as variable bandwidth overhead and high overhead that may result in bandwidth limitation and transparency issues. The high overhead makes it virtually impossible to carry a full 10 Gb/s Ethernet signal in SONET OC-192C or OTN OTU2 byte containers. For example, OTU2 cannot carry 10 Gb/s Ethernet using GFP transparent mode. OPU2 payload capacity is not sufficient for direct mapping of 64B/66B code words. GFP Frame Mapped Mode cannot be used to transport CDL Ethernet, since the Ethernet preamble is discarded. Furthermore, extensions to the GFP Frame Mapped Mode maintain its high overhead. These overheads are provided to support capabilities that are redundant to CDL Ethernet. For example, GFP Frame Mapped Mode defines an idle packet. CDL Ethernet already includes an idle packet. Furthermore, GFP Frame Mapped Mode defines client management packets which compete with client packets for bandwidth or have an indeterminate latency. In the case of FEC based on G.975 that support only OC-192/5TM-16 signal, the GFP frame mapping over SONET/SDH payload will reduce the available bandwidth down to 9.584 Gb/s.

Further drawbacks to GFP include the rate control (e.g. the open-loop rate control in 10 Gb/s WAN PHY and compatible MAC) which is required to carry 10 Gb/s Ethernet into OC192. GFP also requires use of the linear extension header and therefore even larger overhead and lowering of the rate to support packet-by-packet multiplexing. Moreover, transport network elements are needed by GFP to inject frames into the client frame stream for OAM&P. In the case of FEC based on G.975 that support only OC-192/STM-16 signal, the GFP frame mapping over SONET/SDH payload will reduce the available bandwidth down to 9.584 Gb/s.

In the absence of a suitable encapsulation/mapping procedure, and to meet the above objectives, an efficient framing procedure for Ethernet is needed.

SUMMARY OF THE INVENTION

A method of processing Ethernet signals for transport in an optical network system is disclosed. The method comprises encapsulating Ethernet frames into EFP frames comprising a length header, a converged data link header, and a data area, and mapping the EFP frames into byte synchronous paths. The converged data link header replaces an Ethernet preamble of the Ethernet packet. The converged data link header may have been inserted into the Ethernet frame prior to encapsulation.

The method may include SONET/SDH mapping, G.975 FEC mapping, or OTU/G.709 mapping, for example.

In another aspect of the invention, a method for framing byte aligned variable length packets for transport in an optical network system comprises replacing a preamble of the packet with a header comprising an operations, administration, and maintenance field, a message channel, an application specific field, and a header error detection field, which attempts to maximize the bandwidth.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. The network may be a packet based optical network that uses Ethernet data layer at speeds of 10 Gb/s (or above or below 10 Gb/s), both over high speed point-to-point circuits (i.e., dark fiber) and over WDM. However, it is to be understood that the system may be used with media types different than those described herein, without departing from the scope of the invention. A network element may be, for example, a terminal multiplexer, an add-drop multiplexer (ADM), an optical crossconnect (OXC), a signal regenerator, router, switch, or other optical node interface. The invention described herein may be implemented in dedicated hardware, microcode, software, or photonic (optical) logic.

An efficient framing procedure (EFP) for Ethernet is described herein. EFP is a method of delineating Ethernet packets (i.e., byte aligned variable length packets) for subsequent mapping into byte synchronous paths such as the SONET/SDH and OTN (based on, for example, ITU-T G.975). EFP also provides a set of adaptation functions for subsequent mapping into byte synchronous paths such as the SONET/SDH and OTN.

As described in detail below, EFP carries all seven Ethernet preamble bytes and removes the SFD. EFP is able to carry CDL based Ethernet packets with the removed SOF. EFP adds four bytes; two for length and two for CRC to enable single bit correction and multi-bit detection within the two length bytes. EFP enables 10 Gb/s Ethernet to be mapped into constant bit stream (e.g., at 9.953 Gb/s) for maximum packet sizes less than 1878 bytes. This also applies to direct mapping over G.975 FEC payload. EFP also enables 10 Gb/s Ethernet to be mapped into OTU2 for maximum packet sizes less than 15177 bytes without requiring any rate control. Thus, EFP enables use of 10 Gb/s Ethernet in long haul networks where FEC is a requirement. EFP, through its inclusion of CDL (Converged Data Link) header supports packet-by-packet multiplexing and OAM&P.

Figure 1:
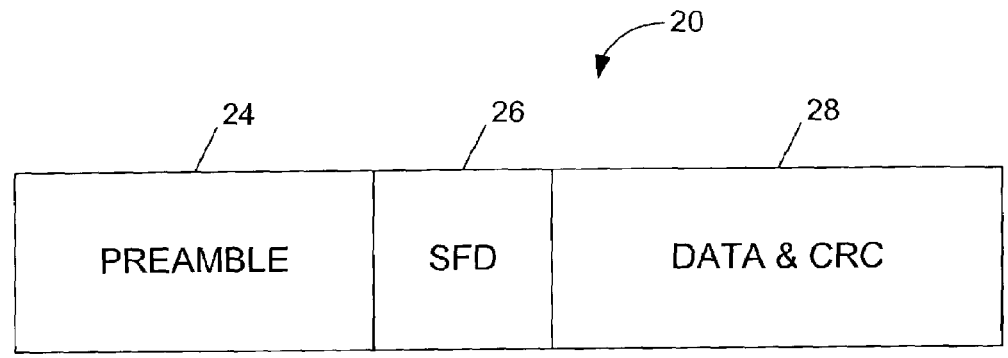
FIG. 1 illustrates a simplified Ethernet frame format.

Referring now to the drawings, and first to FIG. 1, a simplified example of an Ethernet frame 20 is shown. The frame includes a preamble 24, start of frame delimiter (SFD) 26, and a data field 28 (which includes CRC (Cyclic Redundancy Checks). Standard IEEE 802.3 Ethernet packets typically include the following fields (not shown) after the preamble: destination address, source address, length or type field, data field, and frame check sequences.

Figure 2A:
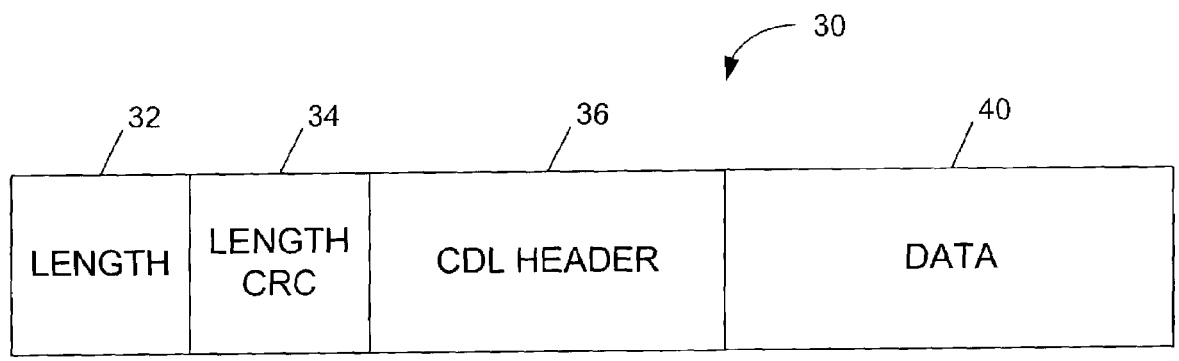
FIG. 2A illustrates an EFP frame format for Ethernet packets.

FIG. 2A illustrates an example of an EFP encapsulated frame 30. The EFP frame 30 is byte aligned and consists of a Length Header, a CDL Header 36, and an EFP Data area 40. The Length Header includes a 16-bit length field 32 (supporting packets of size up to 64 k bytes) and a 16-bit length CRC (LCRC) field 34. The length encompasses the entire frame and the minimum value for length is preferably 11. This minimum value is used to fill the bandwidth when no Ethernet Packets are available or when CDL idle packets are received from a client interface. A value of zero in the length field identifies an EFP idle frame. Length values from 1 to 10, inclusive, are reserved for future definition. The Length Header is scrambled by exclusive-OR (also known as "modulo 2 addition") with the hex value B6AB31E0 (which is the maximum transition, minimum sidelobe, Barker-like sequence of length 32).

The 16-bit LCRC is computed over the 16-bit length field. It is used for single bit error correction and multi-bit error detection. The LCRC generating polynomial may be, for example:

$$G(x)=x^{16}+x^{12}+x^{5}+1$$

where:

x^16 corresponds to the most significant bit; and x^0 corresponds to the least significant bit.

The 16-bit Length is taken to be a polynomial L(x) of degree 15. L(x) is multiplied by x^16 (modulo-2) and divided by G(x). The remainder is a polynomial C(x) of degree 15 or less and is the LCRC. LCRC is transmitted MSB (coefficient of x^15) first.

Packet delineation is performed using a 2-byte length and 2-byte length CRC. Frame delineation may be performed, for example, using the Length and the LCRC in a Hunt procedure. The Hunt procedure is performed in parallel over eight streams. When a pre-synch state is reached (i.e., a match between length and CRC is found) and is maintained for the next frame, the synch is declared.

The CDL Header is described in U.S. patent application Ser. No. 09/668,253, filed Sep. 21, 2000, entitled Method and System for Providing Operations, Administration, and Maintenance Capabilities in Packet Over Optics Networks, which is incorporated herein by reference in its entirety. The CDL header provides operations, administration, maintenance and provisioning (OAM&P) (or OAM, or any single feature or combination thereof), multiplexing, and multiple qualities of service in packet over optics networks. For example, CDL may support general management of optical networks, supervision of unused channels, provisioning of optical paths, performance monitoring of optical paths, and failure recovery. CDL also enables multiplexing of multiple logical lower speed circuits across a single optical channel including support for a multi-access form of statistical multiplexing appropriate to ring topologies and support for frame-by-frame multiplexing. It is to be understood that CDL may provide all of the above mentioned functions, only one of these functions, or any combination thereof, without departing from the scope of the invention. CDL Ethernet employs the same PMA and PCS layers as Ethernet for signal rates of 100 Mb/s, 1000 Mb/s, and 10 Gb/s. This addresses transport of Ethernet and CDL Ethernet over short reach, intermediate reach, and long reach dark fiber links.

CDL is a wrapper around the link layer packet. The CDL wrapper comprises a self-contained 7 byte CDL header that is prepended to standard Ethernet packets (e.g., IEEE 802.3) by replacing a preamble of the Ethernet packet. When applied to a standard Ethernet frame (IEEE 802.3), the CDL wrapper substitutes the SFD byte and the preceding six preamble bytes. The Ethernet frame is located after the CDL header, which replaces bytes in the standard Ethernet preamble. It is to understand that although the invention is described herein using an Ethernet packet, other types of packets having a preamble may also be used. Thus, the term "Ethernet packet" or "Ethernet frame" as used herein includes packets or frames formatted according to standards other than IEEE 802.3.

Figure 3:
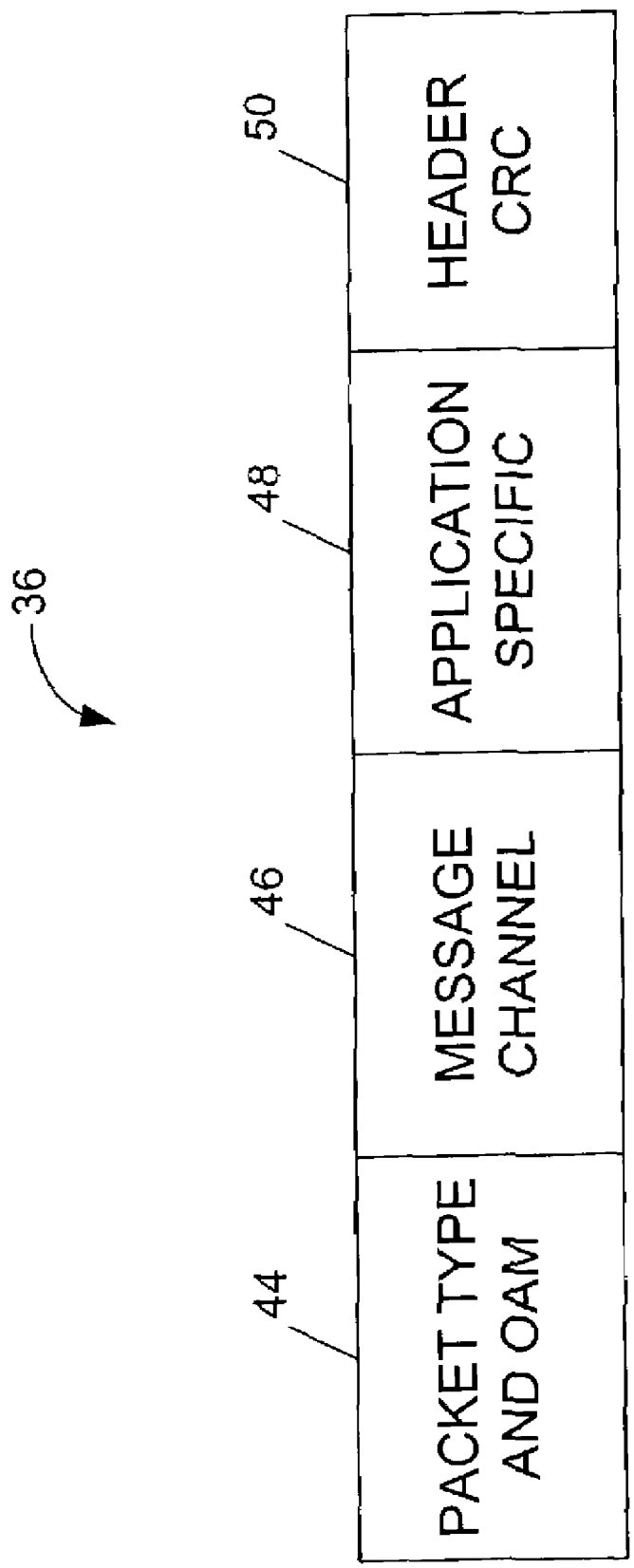
FIG. 3 illustrates a format of a Converged Data Link (CDL) header.

FIG. 3 illustrates an example of fields within the CDL header. The fields preferably included in the CDL header 36 are:
  Byte [1]: Packet type and OAM information 44
  Byte [2]: Message channel 46
  Byte [3-6]: Application specific information 48
  Byte [7]: Header cyclic redundancy check (CRC) 50

The OAM field 44 carries packet type information, error flags, and an automatic protection switching (APS) subchannel. OAM includes, for example, the following fields:
  PT: Packet Type Field
  AF: APS Framing
  EB: End-to-end Backward Defect Indication (BDI-E)
  EF: End-to-end Forward Defect Indication (FDI-E)
  HB: Hop-by-hop Backward Defect Indication (BDI-H)
  HF: Hop-by-hop Forward Defect Indication (FDI-H)

Automatic protection switching (APS) provides the capability of a transmission system to detect a failure on a working facility and to switch to a standby facility to recover the traffic, thus, improving overall system availability. The type field identifies whether or not the data and CRC fields are present.

The message channel 46 provides a communication mechanism between network elements. Messages are hop-by-hop and may be forwarded or routed according to established routing protocols. The message channel 46 allows management communication over the same physical facilities as the user data but without taking any bandwidth from the user data.

The application specific (AS) field 48 carries information between end nodes that is forwarded along an optical path. The application specific field 48 may include a subinterface identifier to assist in multiplexing packet streams. The application specific field 48 may also be used to support applications other than multiplexing. For example, the application specific field 48 may be used to facilitate multi-protocol label switched routing.

The header CRC 50 is employed for header error protection and covers the CDL header. The CRC is preferably computed over the entire value of the CDL header, including the AS field 48. The CRC may be based on CRC-8 [ITU-T G.432.1]. For example, the CRC header may be an 8-bit sequence that is the remainder of the modulo-2 division by the generator polynomial $x^8+x^2+x+1$ of the product $x^8$ multiplied by the content of the CDL header excluding the header CRC. The 48-bit long relevant portion of the CDL header is taken to represent a polynomial of order 47. The coefficients can have the value 0 or 1. The first bit of the header represents the coefficient of the highest order ($x^47$) term. The polynomial operations are performed modulo-2. The CRC header is preferably recomputed whenever any of the fields in the header are changed and passed transparently whenever the fields of the header do not change.

It is to be understood that other related or unrelated fields may be included between any of the above fields or the fields may be in a different order without departing from the scope of the invention.

Referring again to FIG. 2A, the EFP frame includes EFP Data 40. The EFP Data area may be scrambled using a $1+x^{43}$ self-synchronous scrambler. If it is not required to provide security against payload information replicating scrambling word (or its inverse) from a frame synchronous scrambler, such as those used in the SDH RS layer or in an OTN OPUk channel, the Data area may not be scrambled. The content of Data area 40 preferably includes an FCS (Frame Check Sequencer) field for Ethernet packets.

Figure 2B:
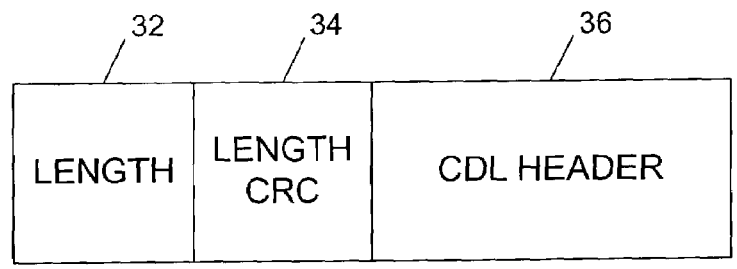
FIG. 2B illustrates an EFP frame format for idle frames.

EFP packet types include EFP Ethernet packet, EFP CDL idle, and EFP idle. The EFP CDL idle is the mapping of a CDL idle packet coming from the client interface that has to be propagated to the far end client. The EFP CDL idle includes the length 32, length CRC 34, and CDL header 36 fields. EFP CDL is used for fault propagation purposes, as described above. The EFP idle, shown in FIG. 2B, is used to fill the bandwidth when there is nothing to transmit. The EFP idle frame is provided as a filler frame, since one of the requirements for mapping EFP frames into octet synchronous paths is for the capacity of such paths to be not less than the capacity required by the Ethernet stream. The EFP idle frame may also be used to enable frequency tolerance compensation. EFP Idle Frames have a length of 11 and are identified by 0 in the Length field 32.

Defect Handling is provided by the CDL header. A Client Signal Fail condition (e.g., loss of signal) is handled by the EFP source generating a stream of all EFP Idle frames and setting the FDI-H bit in the CDL header (see previous description of defect indication bytes in CDL header). The 10 Gb/s EFP sink, on receiving the EFP Idle frame with FDI-H bit set, begins to forward the LF SOS (Local Fault Sequence Ordered Set), as specified, for example, in IEEE 802.3ae 10 Gb/s Ethernet Task Force, Section 46.3.2. The EFP sink stops to forward LF SOS if an EFP Idle frame with FDI-H bit clear or an EFP Client Data frame is received. A 10 Gb/s EFP source, upon receiving RF (Remote Fault) SOS and determining the RF condition, begins to generate a stream of all EFP Idle frames. The BDI-E bit the CDL Header is then set.

The 10 Gb/s EFP sink, upon receiving EFP Idle frame with BDI-E bit set or an OTU2-AIS (Alarm Indication Signal) defined by the ITU G.709 standard, begins to forward RF SOSs. The EFP source stops forwarding EFP Idle frames with BDI-E set when the RF condition clears (as specified in IEEE 802.3ae Section 46.3.2). The EFP sink stops forwarding RF SOSs if an EFP Idle frame with BDI-E bit clear or an EFP Client Data frame is received or OTU2-AIS clears (as specified in ITU-T G.709). In addition, an LF and RF indication are propagated to the far end using the same CDL FDI/BDI propagation mechanism.

When Ethernet traffic is sent to a SONET/SDH network, the Ethernet frames are first mapped into a frame with an appropriate structure and then mapped to the SONET (or other appropriate payload envelope). The following describes how EFP may be used to transport 10 GE interface over a WDM system that uses FEC to improve optical system performance. In one embodiment, the system provides rate adaptation between a 10 GE client interface (10.3125 Gb/s) and a G.975 FEC payload rate (9.9532/s).

Figure 4:
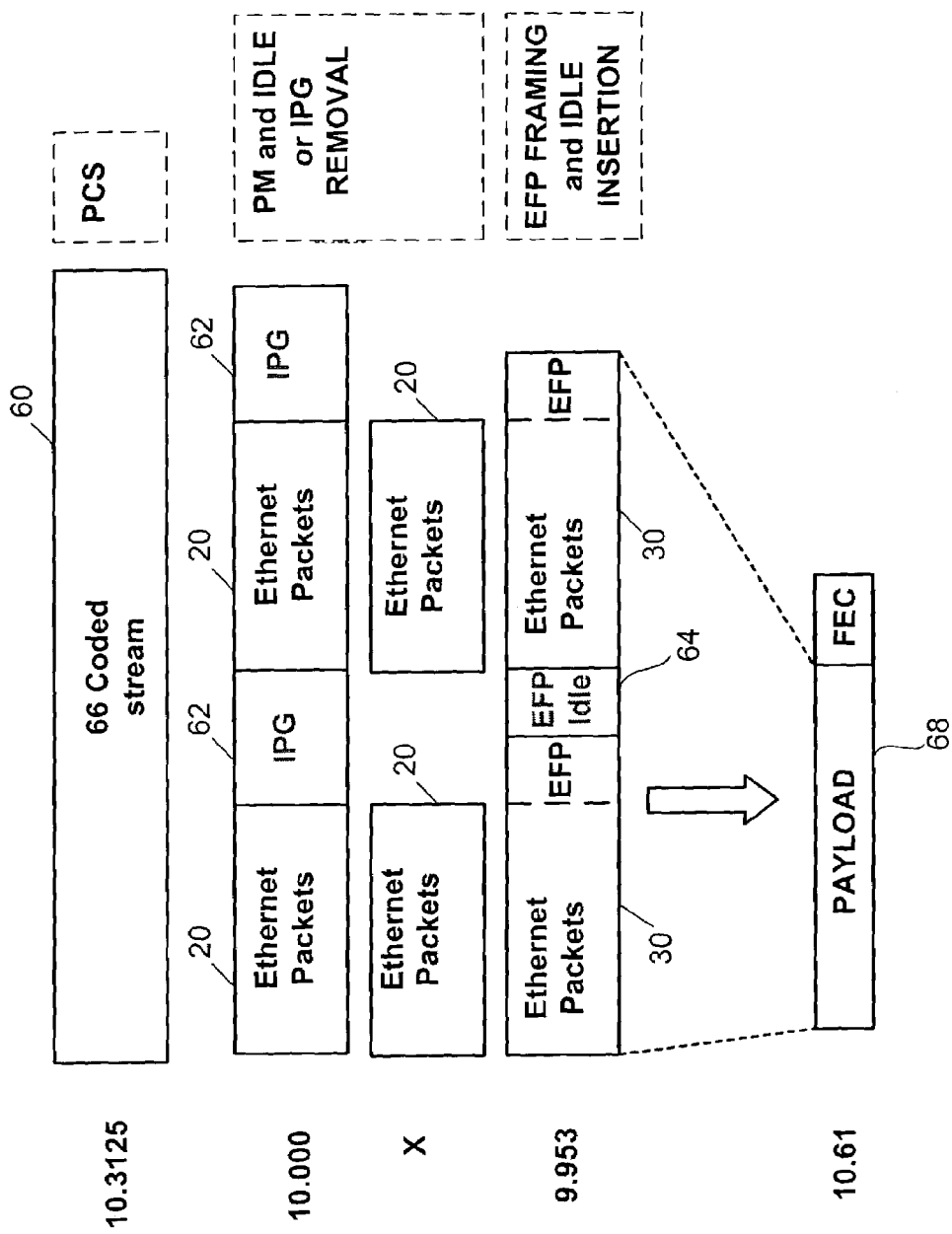
FIG. 4 is a diagram illustrating transmitting flow rate adaptation between a 10 GE client interface and an FEC payload rate.

FIG. 4 is a high level block diagram illustrating rate adaptation in the transmitting direction. The 10.3125 Gb/s signal is converted to an XGMII (10G Medium Independent Interface) through a standard Ethernet PCS (Physical Coding Sublayer) block 60. The IPGs (InterPacket Gaps) 62 are then removed and the EFP mapping procedure (described above) is used to build a constant bit stream running at 9.9532 that will be sent to FEC payload 68 for encoding. EFP framing is performed and EFP idle frames 64 are inserted as required. The signal may be mapped into an FEC frame of a long-haul DWDM transport platform, such as ONS 15808, available from Cisco Systems, Inc. of San Jose, Calif., for example. To maximize the available bandwidth, the insertion of overhead bytes is preferably limited to three (the minimum set required for alignment purposes).

Figure 5:
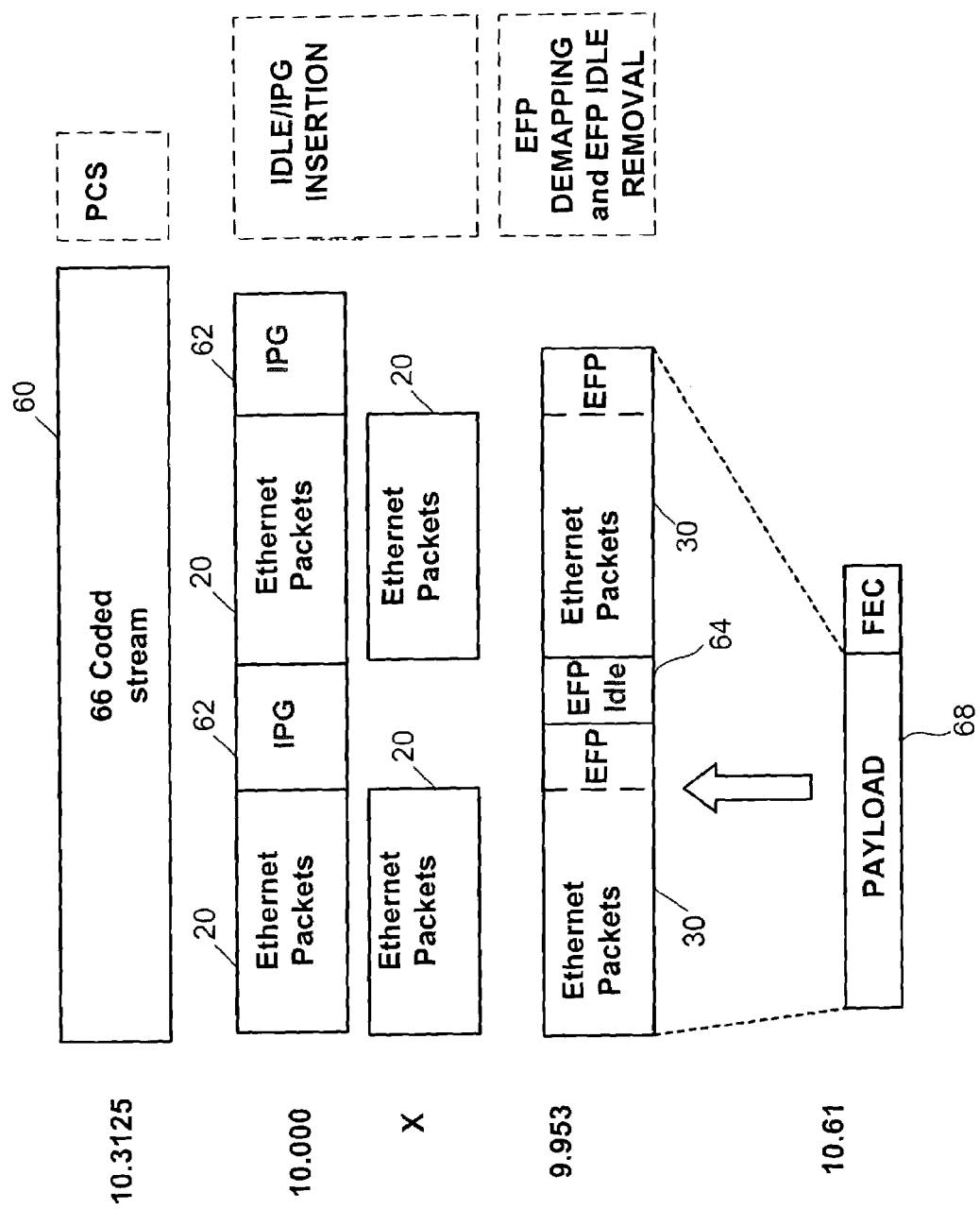
FIG. 5 is a diagram illustrating receiving flow rate adaptation between a 10 GE client interface and an FEC payload rate.

FIG. 5 illustrates receiving flow rate adaptation. The EFP frames 30 are preferably detected using a parallel Hunt algorithm to minimize the time for EFP alignment. The EFP overhead is then removed and the IPG and the SFD are reinserted. After the EFP de-mapping process is complete the Ethernet packets 20 are sent to PCS coding block 60 and IPG 62 are inserted as required. If the client network is based on standard Ethernet (IEEE 802.3), the packet preamble bytes are replaced by CDL preamble. If the client network includes CDL preamble capability, the preamble bytes are passed through.

Figure 6:
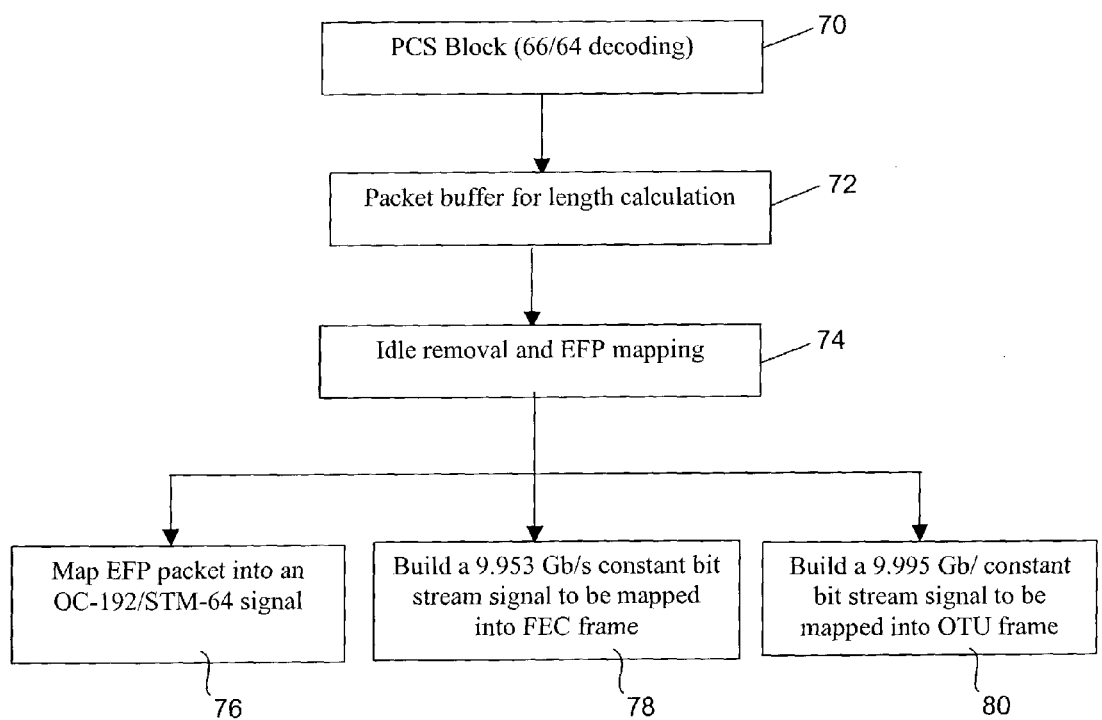
FIG. 6 is a flowchart illustrating a process for the flow rate adaptation shown in FIG. 4.

FIG. 6 is a flowchart illustrating the flow rate adaptation described above along with two additional methods. At step 70, PCS block decoding is performed. Packet buffer for length calculation is performed at step 72. Next, idle removal and EFP mapping are performed (step 74). At step 78, a 9.953 Gb/s constant bit stream signal is built to be mapped into a G.975 FEC frame (as previously described). As shown at step 76, the EFP packet may also be mapped into a SONET/SDH payload (OC-192/STM-64 transceiver). Another option is to build an EFP stream of 9.995 Gb/s (OPU2 payload rate) so that the EFP stream can be directly mapped into a ITU-T G.709 frame (step 80).

The available bandwidth for Ethernet packet transport in the three methods of FIG. 6 (steps 76, 78, and 80) is as follows:

9.584 Gb/s for SONET/SDH mapping
9.953 Gb/s for G.975 FEC mapping
9.995 Gb/s for OTU/G.709 mapping The following is an example of a calculation of the maximum packet size (L) that can be carried using EFP.

$$(L+IPG_{min})WDM\text{Payload\_rate}(1-Delta\nu WDM)=(L+EFP_{OH})10G(1+Delta\nu\text{Client})\Delta V_{max}=10G(1+Delta\nu\text{Client})-WDM\text{Payload\_rate}(1-Delta\nu WDM)$$

$$L = \frac{WDM\text{Payload\_rate}(1 - Delta\nu WDM)IPG_{min} - 10G(1 + Delta\nu\text{Client})EFP_{OH}}{\Delta V_{max}}$$

From the above equation, the maximum packet size (L) that can be carried by the SONET OC192 signal using EFP is calculated as approximately 19000 bytes for OPU mapping, 1800 for G.975 FEC payload (9.953 Gb/s) and 200 for OC-192/STM16 mapping. Precise values depend on the clock accuracy.

The following table provides examples of calculations for maximum packet size (L) for payload rates (WDMPayload_rate) of 9.54 Gb/s, 9.953 Gb/s, and 9.999. Gb/s with an IPG of 12 and 70:

|  | SONET/SDH | G.975 FEC | OTN |
|---|---|---|---|
| Payload rate (Gb/s) | 9.54 | 9.953 | 9.999 |
| Max packet size supported (12 IPG) | 200 | 1800 | 19000 |
| Max packet size supported (70 IPG) | 1541 | 14000 | 135000 |

The following is a bandwidth performance calculation example assuming a constant flow of maximum Ethernet packet length (1518 bytes) with a minimum average IPG of 10.5. This average IPG takes into account the RS IPG removal/insertion and frequency compensation. With an available data bandwidth of 9.95328 Gbs, the maximum continuous stream packet length is calculated as follows:

$$(L+IPG_{min})\cdot 9.95328\cdot(1-50\ ppm)=(L+GFP_{OH})\cdot 10G\cdot(1+100\ ppm)\Delta\nu_{max}=10G\cdot(1+100\ ppm)-9.95328\cdot(1-50\ ppm)$$

$$L = \frac{9.95278 \cdot IPG_{min} - 10.001 \cdot GFP_{OH}}{\Delta\nu_{max}}$$

The maximum packet length that can be supported is:
L=allowed packet length=1545 byte In the above calculation, the (−50 ppm) and (+100 ppm) values are based on assumed clock drift values for outgoing and incoming WDM clocks.

The maximum packet length specified by the IEEE 802.3ae standard is 1518+8 bytes. Therefore, the system and method described herein is able to support a worst-case Ethernet payload without flow control. However, flow control may be required for jumbo frames. Flow control may be implemented by monitoring the last memory load (i.e., the one that generates the output constant bit stream) and, as soon as a threshold is crossed, the EFP framing block generating a pause Ethernet packet (e.g., as defined in IEEE 802.3ae) in order to ask the client interface to reduce the bandwidth load. This method generally avoids the drop of packet in case of bandwidth overload.

Figure 7:
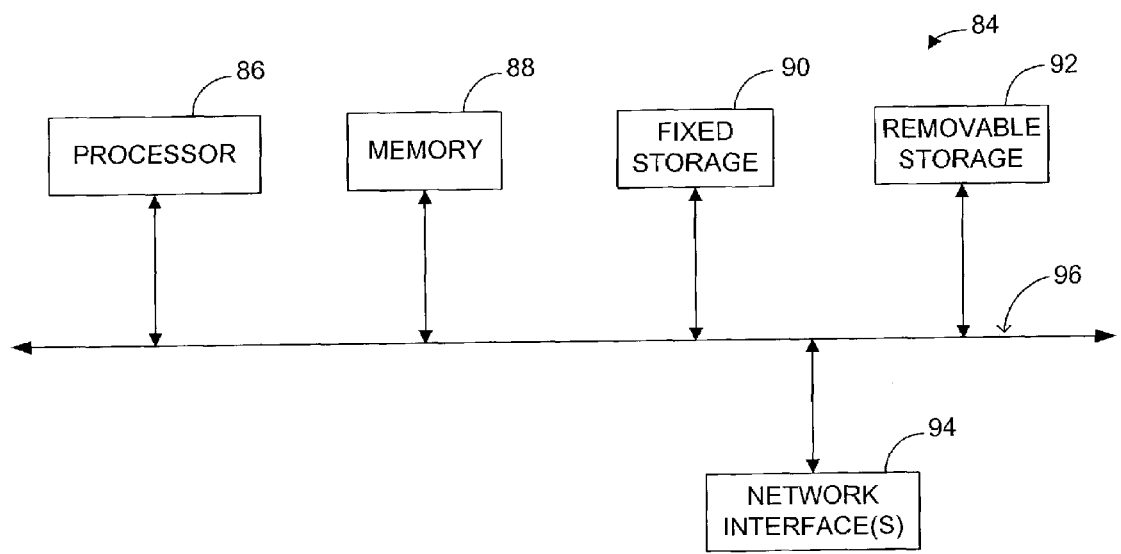
FIG. 7 is a system block diagram of a computer system that can be utilized to execute software of an embodiment of the present invention.

FIG. 7 shows a system block diagram of computer system 84 that may be used as a router or host or used to execute software of an embodiment of the invention. The computer system 84 includes memory 88 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 84 further includes subsystems such as a central processor 86, fixed storage 90 (e.g., hard drive), removable storage 92 (e.g., CD-ROM drive), and one or more network interfaces 94. Other computer systems suitable for use with the invention may include additional or fewer subsystems. For example, computer system 84 may include more than one processor 86 (i.e., a multi-processor system) or a cache memory.

The system bus architecture of computer system 84 is represented by arrows 96 in FIG. 7. However, these arrows are only illustrative of one possible interconnection scheme serving to link the subsystems. For example, a local bus may be utilized to connect the central processor 86 to the system memory 88. Computer system 84 shown in FIG. 7 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, EFP has a low fixed overhead per packet. EFP makes it possible to carry a full 10 Gb/s Ethernet signal in the SONET OC-192C or the OTN OTU2 byte containers. Furthermore, EFP makes it unnecessary to apply any rate control to the client signal.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method of processing Ethernet signals for transport in an optical network system, the method comprising encapsulating Ethernet frames into Efficient Framing Procedure (EFP) frames comprising a length header, a converged data link header configured to provide support for operations, administration, and maintenance, and a data area, and mapping said EFP frames into byte synchronous paths, wherein the converged data link header replaces an Ethernet preamble of an Ethernet packet and the byte synchronous path is Optical Transport Unit (OTU).

2. The method of claim 1 wherein the converged data link header is configured to provide support for network management.

3. The method of claim 1 wherein the converged data link header is configured to support multiplexing.

4. The method of claim 1 wherein the converged data link header is configured to support defect handling.

5. The method of claim 1 wherein the byte synchronous path is Synchronous Optical Network (SONET).

6. The method of claim 1 wherein the byte synchronous path is Forward Error Correction (FEC) payload.

7. The method of claim 1 wherein encapsulating comprises replacing a Start-of-Frame Delimiter byte with a header Cyclic Redundancy Check (CRC) byte.

8. The method of claim 1 wherein the length header comprises a length field and a length Cyclic Redundancy Check (CRC) field.

9. The method 1 wherein the EFP frame is configured to provide single bit error correction.

10. The method of claim 1 wherein the EFP frame is configured to provide multi-bit error detection.

11. The method of claim 1 wherein encapsulating comprises inserting EFP idle frames as filler frames.

12. The method of claim 1 further comprising removing inter-packet gaps.

13. The method of claim 1 further comprising transparent mapping of Ethernet stream based on Converged Data Link (CDL).

14. The method of claim 1 wherein mapping comprises building a constant bit stream.

15. The method of claim 14 further comprising mapping the EFP frame into a forward error correction frame.

16. The method of claim 14 wherein the constant bit stream runs at approximately 9.953 Gb/s.

17. The method of claim 1 further comprising sending said Ethernet frames to a Physical Coding Sub-layer (PCS) coding block.

18. The method of claim 1 wherein said EFP frames are mapped into an OC-192 signal.

19. The method of claim 18 wherein said EFP frames are mapped without rate control.

20. The method of claim 18 wherein said EFP frames are mapped utilizing rate control.

21. The method of claim 1 wherein said EFP frames are mapped into an Optical Transport Unit 2 (OTU2) frame.

22. The method of claim 21 wherein said EFP frames are mapped without rate control.

23. The method of claim 21 wherein said EFP frames are mapped utilizing rate control.

24. The method of claim 1 wherein said converged data link header comprises an application specific field.

25. The method of claim 24 wherein the application specific field supports multi-protocol label switched routing.

26. The method of claim 1 wherein said converged data link header includes a message channel.

27. The method of claim 1 wherein said converged data link header replaced the Ethernet preamble prior to encapsulation of the Ethernet frame.

28. A method of processing Ethernet signals for transport in an optical network system, the method comprising encapsulating Ethernet frames into Efficient Framing Procedure (EFP) frames comprising a length header, a converged data link header configured to provide support for operations, administration, and maintenance, and a data area, and mapping said EFP frames into byte synchronous paths, wherein the converged data link header replaces an Ethernet preamble of an Ethernet packet and comprises an automatic protection switching subchannel.

29. A computer-readable storage medium encoded with a computer program for processing Ethernet signals for transport in an optical network system, the computer program comprising:

code that encapsulates Ethernet frames into Efficient Framing Procedure (EFP) frames comprising a length header, a converged data link header configured to provide support for operations, administration, and maintenance, and a data area, the converged data link header replacing an Ethernet preamble of an Ethernet packet; and code that maps said EFP frames into byte synchronous paths, wherein the byte synchronous path is Optical Transport Unit (OTU).

30. An apparatus comprising:

a processor operable to receive Ethernet frames comprising a preamble and a data field, replace said preamble with a converged data link header configured to provide operations, administration, and maintenance, generate Efficient Framing Procedure (EFP) frames comprising said converged data link header and a data area, map said EFP frames into byte synchronous paths, and forward said EFP frames to an optical network; and a Physical Coding Sub-layer (PCS) block for rate adaptation.

31. The apparatus of claim 30 wherein the processor is configured to replace a Start-of-Frame Delimiter in the Ethernet frame with a Cyclic Redundancy Check in the EFP frame.

32. The apparatus of claim 30 wherein the processor is configured to insert one or more idle EFP frames as filler frames before mapping said EFP frames.

33. The apparatus of claim 30 wherein the converged data link header comprises the same or a fewer number of bytes than the preamble it replaced.

34. The apparatus of claim 30 wherein said converged data link header comprises an automatic protection switching sub-channel.

35. The apparatus of claim 30 wherein the processor is configured to map 10 Gb/s Ethernet into a constant bit stream.

36. The apparatus of claim 30 wherein the processor is configured for packet-by-packet multiplexing.

37. The apparatus of claim 30 wherein the processor is configured to map over Forward Error Correction (FEC) payload.

38. The apparatus of claim 30 wherein the EFP frames are not Generic Frame Procedure (GFP) Frames.

* * * * *